United States Patent [19]
Edel et al.

[11] Patent Number: 5,872,979
[45] Date of Patent: Feb. 16, 1999

[54] METHOD AND SYSTEM FOR REMOVING SOFTWARE INVOLVING SHARED FILES

[75] Inventors: Thomas Ronald Edel; Leonard William Leslie; Lawrence Garnold Richards; Jerrold Rubin, all of Austin, Tex.

[73] Assignee: International Business Machines Corporation, Armonk, N.Y.

[21] Appl. No.: 368,193

[22] Filed: Jan. 4, 1995

[51] Int. Cl.[6] ....................................................... G06F 15/18
[52] U.S. Cl. ........................... 395/712; 395/651; 395/653; 395/676; 364/281.9; 364/282
[58] Field of Search ..................... 395/700, 650, 395/653, 676, 712, 651; 364/281.9, 282

[56] References Cited

U.S. PATENT DOCUMENTS

| | | | |
|---|---|---|---|
| 4,604,690 | 8/1986 | Crabtree et al. | 364/200 |
| 4,862,349 | 8/1989 | Foreman et al. | 364/200 |
| 5,220,654 | 6/1993 | Benson et al. | 395/275 |
| 5,237,690 | 8/1993 | Bealkowski et al. | 395/700 |
| 5,247,683 | 9/1993 | Holmes et al. | 395/700 |
| 5,257,368 | 10/1993 | Benson et al. | 395/600 |
| 5,257,371 | 10/1993 | Anezaki | 395/650 |

OTHER PUBLICATIONS

Chong, H., "Take back your system", Windows Sources, v1, n9, p.325(15), Oct. 1993.

Mendelson, E., "The UnInstaller cleans up after messy Windows applications", PC Magazine, v12, n4, p40(1), Feb. 1993.

Bass, S., "Unistallium practicalus", PC World, v11, n6 p300(1), Jun. 1993.

Seltzer, L., "UnInstaller utility effectively removes Windows programs", PC Week, v9 n50 p117(2), Dec. 1992.

Hofmeister et al, "Dynamic Reconfiguration in Distributed Systems: Adapting Software Modules for Replacement", IEEE Distributed Computing Systems, International Conference, Jun. 1993.

Capretz et al, "Conform –A Software Maintenance Method Based on the Software Configuration Management Discipline ", IEEE Software Maintenance Conference, Nov. 1992.

*Primary Examiner*—Emanuel Todd Voeltz
*Assistant Examiner*—Michael T. Richey
*Attorney, Agent, or Firm*—Jeffrey S. LaBaw; Daniel E. Venglarik; Andrew J. Dillon

[57] ABSTRACT

A method and system for maintaining the integrity of shared files when products are removed and restored. At least two programs, a first program and a second program, within the data processing system share a data structure. A profile is created for the data structure that is shared by the first and second programs. The first program is removed from the data processing system. The shared data structure altered using the profile such that the second program remains on the data processing system unaffected by the alteration of the shared data structure, wherein programs within the data processing system are efficiently maintained.

23 Claims, 9 Drawing Sheets

METHOD AND SYSTEM FOR REMOVING SOFTWARE INVOLVING SHARED FILES

BACKGROUND OF THE INVENTION

1. Technical Field

The present invention relates generally to an improved data processing system and in particular to a method and system for removing a program from a data processing system. Still more particularly, the present invention relates to a method and system for removing a program from a data processing system, in which the program shares one or more files with other programs within the data processing system.

2. Description of the Related Art

In todays data processing systems, programs, also referred to as "software programs" are constantly installed and removed from data processing systems. Multiple reasons exist for removing a software program after it has been installed and configured. For example, incompatibilities with other installed and configured programs, poor performance, unexpected run time results, work station configuration changes, are all valid reasons for removing an installed and configured software program from a user's computer. Some software programs that are installed/configured; add to, delete from, or modify one or more files which are shared with other installed/configured software programs. These conditions create inter-program dependencies.

If, upon a software program removal request, one or more shared files are restored to the state existing when that particular software program was installed/configured, then subsequently installed/configured software programs, which are dependent on these files may not function. The challenge is to undo only the changes mad e to such shared files by the program that is to be removed and, at the same time, honor other subsequent software program installation/configuration shared file dependencies that were made. Such an action should ideally be performed without impacting existing software programs that participate in current software installations because a large number of programs have made no provision for their removal.

With the advent of catalog shopping facilities and license management becoming available for software installation and distribution programs, the base system management platform should provide for support capabilities that do not impact existing programs that are to participate in these new environments. Additionally, it is desirable for program removal to be portable across various operating system platforms such as OS/2 and MS-DOS. "OS/2" is a trademark of International Business Machines Corporation, and "MS-DOS" is a trademark of Microsoft Corporation. Therefore, it would be advantageous to have a method and system for removing a software program from a data processing system in which shared files are restored in a manner that avoids impacting other software programs remaining on the data processing system.

SUMMARY OF THE INVENTION

It is one object of the present invention to provide an improved data processing system.

It is another object of the present invention to provide a method and system for removing a program from a data processing system.

It is another object of the present invention to provide a method and system for removing a program from a data processing system, in which the program shares one or more files with other programs within the data processing system.

It is yet another object of the present invention to provide a method and system for removing a program from a data processing system, in which the program shares one or more files with other programs within the data processing system. This is accomplished without impacting the programs to be removed or other programs in the system.

The present invention provides a method and system for maintaining the integrity of programs in a data processing system. At least two programs, a first program and a second program, within the data processing system can share a data structure. The shared data structure may be a file such as a CONFIG.SYS used in OS/2 and MS-DOS. A syntax and rule profile is created for the data structure that is shared by the first and second programs. Also, a dependency list identifying the requirements for program one and program two on elements within the shared data structure is created. For each shared file, there is a separate dependency list per installed/configured product. The first program is then removed from the data processing system. The shared data structure altered by the first program is then updated to reflect the program's removal while honoring the second program's dependencies. This is accomplished by using the profile defined for the shared data structure and the dependency list created for program two. The second program remains on the data processing system unaffected by the alteration of the shared data structure, wherein programs within the data processing system are efficiently maintained.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart of a process followed by a DEPEND API depicted in accordance with a preferred embodiment of the present invention.

DETAILED DESCRIPTION OF PREFERRED EMBODIMENT

Figure 1:
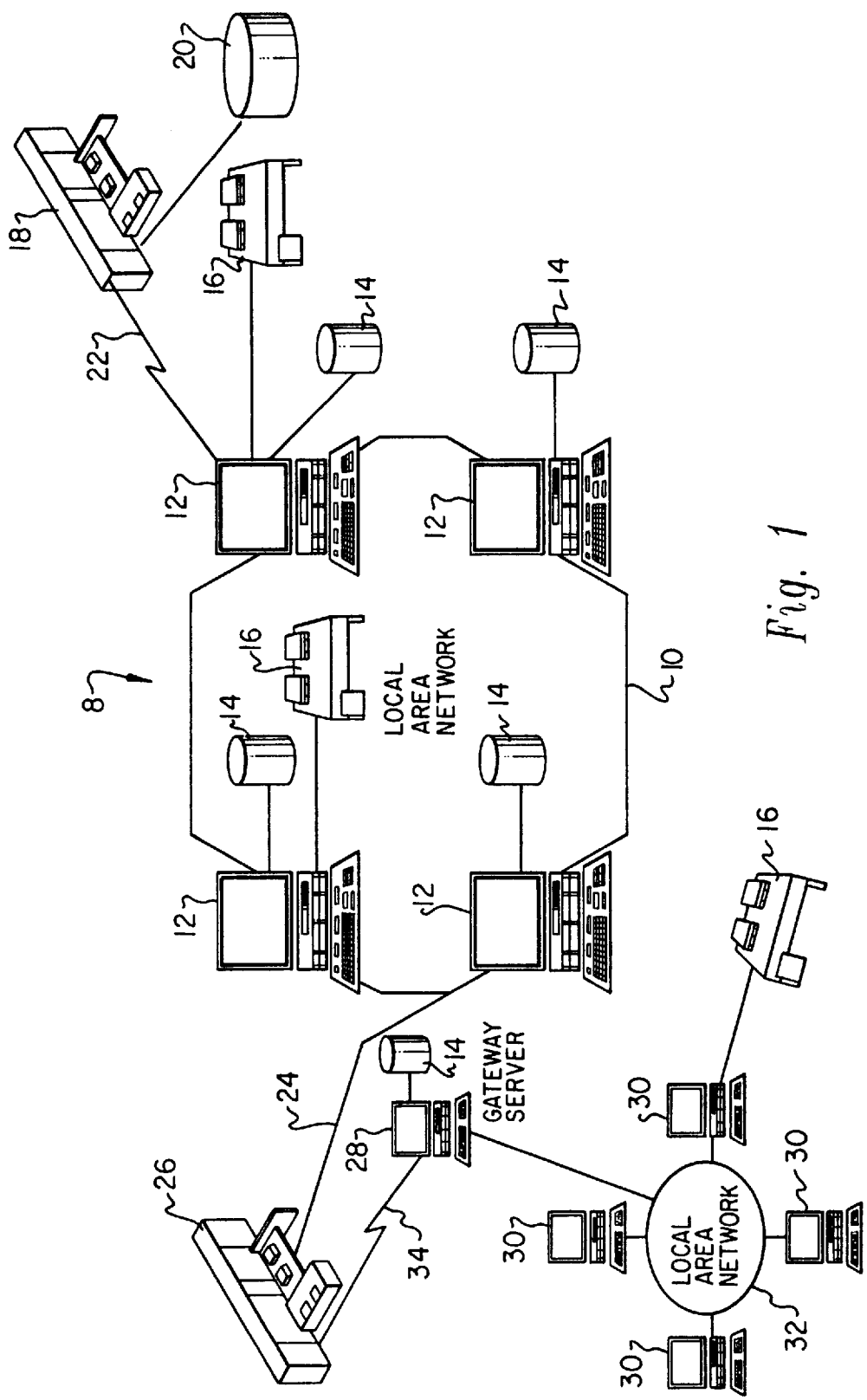
FIG. 1 depicts a pictorial representation of a data processing system which may be utilized to implement a method and system of the present invention.

With reference now to the figures and in particular with reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12 and 30, respectively. Computers 12 and 30 may be implemented utilizing any suitable computer such as the IBM Personal System/2 (also called a "PS/2") computer or an IBM RISC SYSTEM/6000 computer, both products of International Business Machines Corporation, located in Armonk, N.Y. "RISC SYSTEM/6000" is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing a Enterprise Systems Architecture/370 (also called an "ESA/370") or an Enterprise Systems Architecture/390 (also called an "ESA/390") computer available from IBM. Depending on the application a mid-range computer, such as a Application System/400 (also called an "AS/400"), may be employed. "Enterprise Systems Architecture/370", "ESA/370", "Enterprise Systems Architecture/390", and "ESA/390" are trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

A graphic user interface (GUI) operating environment may be found on individual computers 12 and 30, on gateway server 28, on some computer in LAN 10 or 32, or on mainframe computer 18.

Figure 2A:
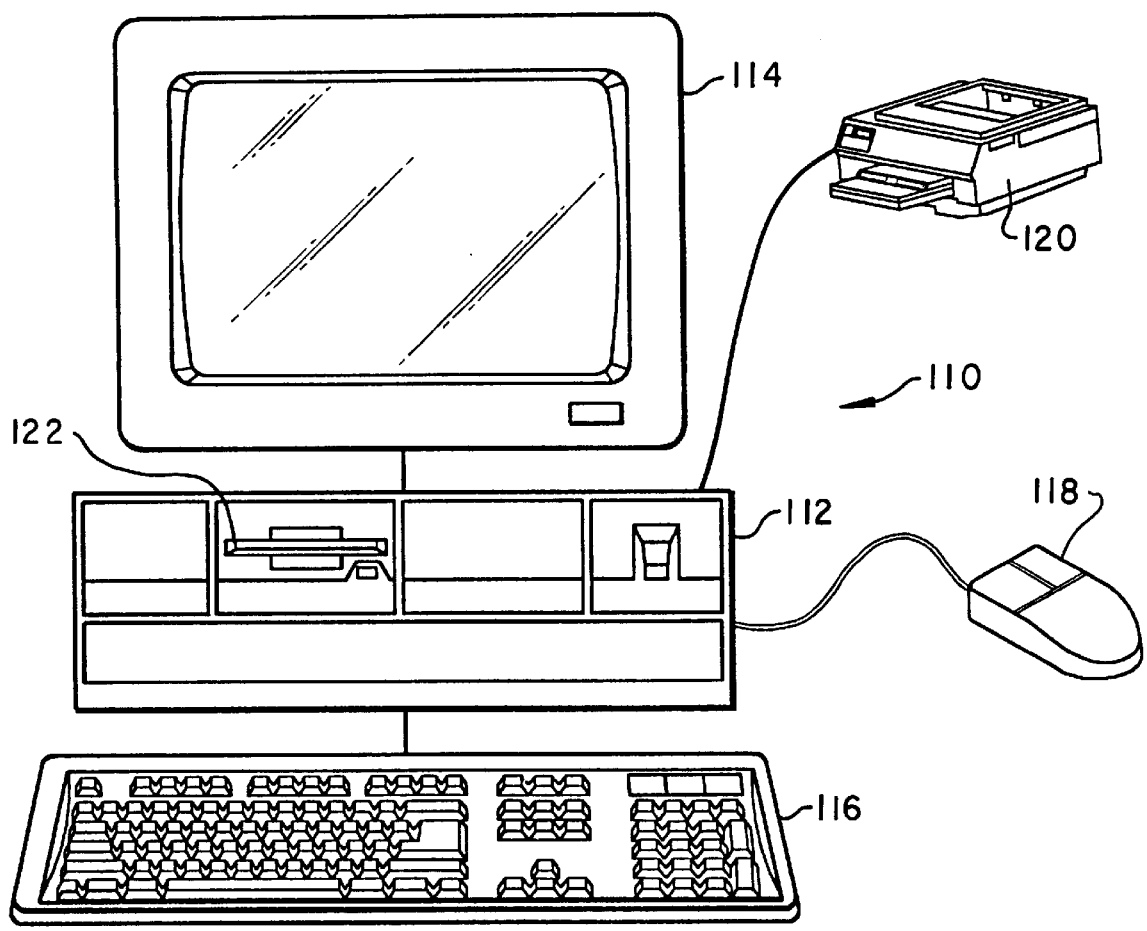
FIG. 2A is a data processing system in which the present invention can be employed is depicted.

With reference to FIG. 2A, a data processing system, personal computer system 110, in which the present invention can be employed is depicted. As shown, personal computer system 112 comprises a number of components, which are interconnected together. More particularly, a system unit 112 is coupled to and can drive an optional monitor 114 (such as a conventional video display). A system unit 112 also can be optionally coupled to input devices such as a PC keyboard 116 or a mouse 118. Mouse 118 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 120, also can be connected to the system unit 112. Finally, system unit 112 may include one or more mass storage devices such as the diskette drive 122.

As will be described below, the system unit 112 responds to input devices, such as PC keyboard 116, the mouse 118, or local area networking interfaces. Additionally, input/output (I/O) devices, such as floppy diskette drive 122, display 114, printer 120, and local area network communication system are connected to system unit 112 in a manner well known. Of course, those skilled in the art are aware that other conventional components also can be connected to the system unit 112 for interaction therewith. In accordance with the present invention, personal computer system 110 includes a system processor that is interconnected to a random access memory (RAM), a read only memory (ROM), and a plurality of I/O devices.

In normal use, personal computer system 110 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2B:
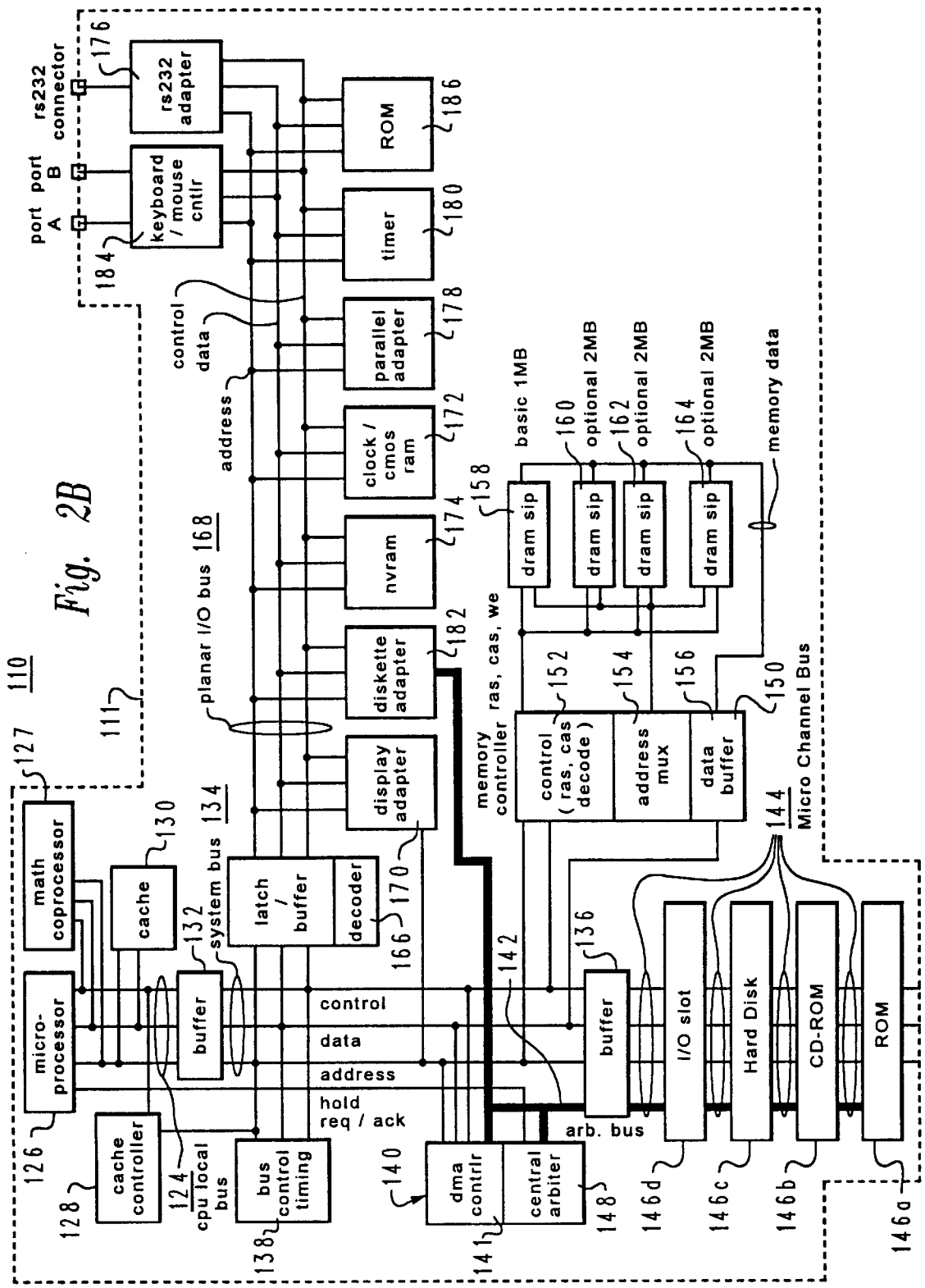
FIG. 2B is a block diagram of a personal computer system illustrating the various components of a personal computer system in accordance with the present invention.

Prior to relating the above structure to the present invention, a summary of the operation in general of personal computer system 110 may merit review. Referring to FIG. 2B, there is shown a block diagram of personal computer system 110 illustrating the various components of personal computer system 110 in accordance with the present invention. FIG. 2B further illustrates components of planar 111 and the connection of planar 111 to I/O slots 146a–146d and other hardware of personal computer system 11. Connected to planar 111 is the system central processing unit (CPU) 126 comprised of a microprocessor which is connected by a high speed CPU local bus 124 through a bus controlled timing unit 138 to a memory control unit 150 which is further connected to a volatile random access memory (RAM) 158. While any appropriate microprocessor can be used for CPU 126, one suitable microprocessor is the Pentium microprocessor, which is sold by Intel Corporation. "Pentium" is a trademark of Intel Corporation.

While the present invention is described hereinafter with particular reference to the system block diagram of FIG. 2B, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2B, CPU local bus 124 (comprising data, address and control components) provides for the connection of CPU 126, an optional math coprocessor 127, a cache controller 128, and a cache memory 130. Also coupled on CPU local bus 124 is a buffer 132. Buffer 132 is itself connected to a slower speed (compared to the CPU local bus) system bus 134, also comprising address, data and control components. System bus 134 extends between buffer 132 and a further buffer 136. System bus 134 is further connected to a bus control and timing unit 138 and a Direct Memory Access (DMA) unit 140. DMA unit 140 is comprised of a central arbitration unit 148 and a DMA controller 141. Buffer 136 provides an interface between the system bus 134 and an optional feature bus such as the Micro Channel bus 144. "Micro Channel" is a registered trademark of International Business Machines Corporation. Connected to bus 144 are a plurality of I/O slots 146*a*–146*d* for receiving Micro Channel adapter cards which may be further connected to an I/O device or memory. In the depicted example, I/O slot 146*a* has a hard disk drive connected to it; I/O slot 146*b* has a CD-ROM drive connected to it; and I/O slot 146*c* has a ROM on an adapter card connected to it. Other devices, such as a modem may be connected to an I/O slot. An arbitration control bus 142 couples the DMA controller 141 and central arbitration unit 148 to I/O slots 146 and diskette adapter 182. Also connected to system bus 134 is a memory control unit 150 which is comprised of a memory controller 152, an address multiplexer 154, and a data buffer 156. Memory control unit 150 is further connected to a random access memory as represented by RAM module 158. Memory controller 152 includes the logic for mapping addresses to and from CPU 126 to particular areas of RAM 158. While the personal computer system 12 is shown with a basic 1 megabyte RAM module, it is understood that additional memory can be interconnected as represented in FIG. 2B by the optional memory modules 160 through 164.

A further buffer 166 is coupled between system bus 134 and a planar I/O bus 168. Planar I/O bus 168 includes address, data, and control components respectively. Coupled along planar bus 168 are a variety of I/O adapters and other peripheral components such as display adapter 170 (which is used to drive an optional display 114), a clock 172, non-volatile RAM 174 (hereinafter referred to as "NVRAM"), a RS232 adapter 176, a parallel adapter 178, a plurality of timers 180, a diskette adapter 182, a PC keyboard/mouse controller 184, and a read only memory (ROM) 186. The ROM 186 includes BIOS which provides the user transparent communications between many I/O devices.

Clock 172 is used for time of day calculations. NVRAM 174 is used to store system configuration data. That is, the NVRAM will contain values which describe the present configuration of the system. For example, NVRAM 174 contains information which describe the capacity of a fixed disk or diskette, the type of display, the amount of memory, etc. Of particular importance, NVRAM 174 will contain data which is used to describe the system console configuration; i.e., whether a PC keyboard is connected to the keyboard/mouse controller 184, a display controller is available or the ASCII terminal is connected to RS232 adapter 176. Furthermore, these data are stored in NVRAM 174 whenever a special configuration program is executed. The purpose of the configuration program is to store values characterizing the configuration of this system to NVRAM 176 which are saved when power is removed from the system.

Connected to keyboard/mouse controller 184 are ports A and B. These ports are used to connect a PC keyboard (as opposed to an ASCII terminal) and mouse to the PC system. Coupled to RS232 adapter unit 176 is an RS232 connector. An optional ASCII terminal can be coupled to the system through this connector.

Specifically, personal computer system 12 may be implemented utilizing any suitable computer such as the IBM PS/2 computer or an IBM RISC SYSTEM/6000 computer, both products of International Business Machines Corporation, located in Armonk, N.Y. "RISC SYSTEM/ 6000" is a trademark of International Business Machines Corporation and "PS/2" is a registered trademark of International Business Machines Corporation.

In a distributed data processing system, a program may be removed from a computer, such as a work station within the distributed data processing system, utilizing a manager program in a server or base computer system in accordance with a preferred embodiment of the present invention. In a single computer data processing system, the management program is located within that data processing system. Such a program management system tracks new, changed, and deleted files.

Figure 3:
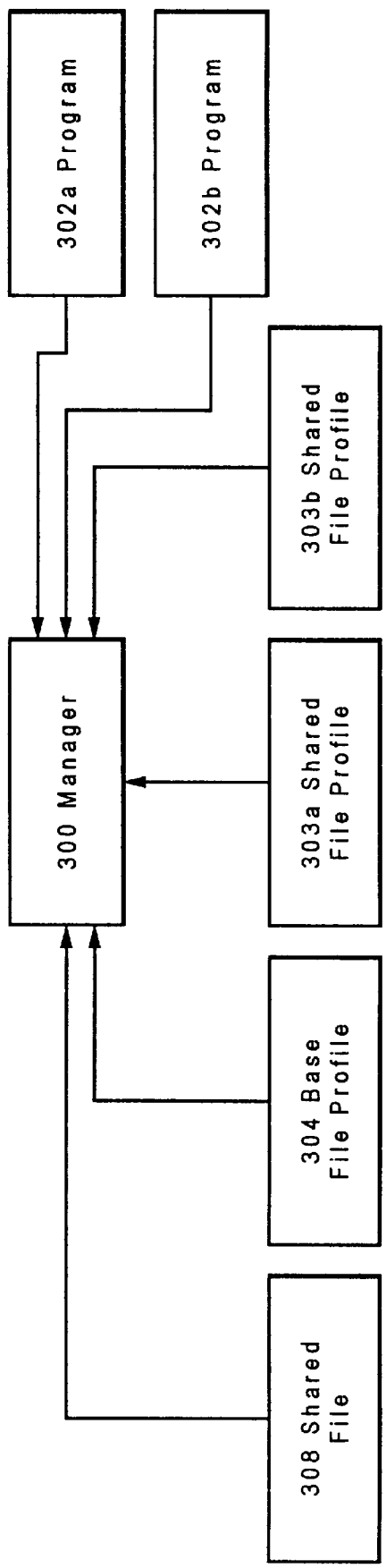
FIG. 3 is a high level flowchart of a process for removing programs from a computer depicted in accordance with a preferred embodiment of the present invention.

With reference now to FIG. 3, a block diagram of software components involved in product removal are depicted in accordance with a preferred embodiment of the present invention. Manager 300 is utilized to remove or restore programs, such as programs 302*a* and 302*b* within a data processing system such as those depicted in FIGS. 1, 2A, and 2B. Manager 300 employs base file profile 304 and shared file profile 303*a* to remove or restore program 302*a* from a data processing system. Program 303*b* may be removed or restored using shared file profile 303*b*. Programs 302*a* and 302*b* share file 308. A vase profile contains the syntax and remove/restore rules for particular statement type appearing in a particular shared file. A shared file profile contains the list of requirements/dependencies that a particular product specifies for a particular shared file. To remove program 302*a*, shared file 308 may need to be altered to remove changes made by program 302*a* while honoring shared file 308's dependencies defined in program 302*b*'s shared file profile. In a distributed data processing system, such as that depicted in FIG. 1, manager 300, base file profile 304, and shared file profiles 303*a* and 303*b* may be located in a server or base computer system within the distributed data processing system while programs 302*a* and 302*b* are located in a local system, such as a work station, in accordance with a preferred embodiment of the present invention. In the event that such a system is utilized on a single computer data processing system, all components would be found within that data processing system.

Figure 4:
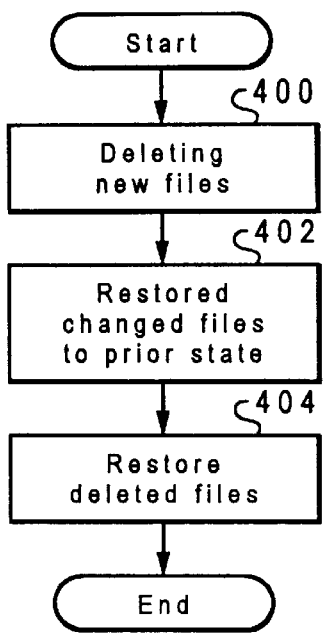
FIG. 4 is a block diagram of software components involved in product removal are depicted in accordance with a preferred embodiment of the present invention.

With reference to FIG. 4, a high level flowchart of a traditional process for removing programs from a computer. The process begins by deleting new files (step 400). Thereafter, files that had been changed by the installation of the program that is to be removed are restored to their prior state (step 402). Thereafter, files deleted when the program was installed are restored (step 404).

By themselves these actions (in particular, restoring changed to files to their prior state) may cause another program within a data processing system to lose an inter-product file dependency because it shared an updated file with the removed program. The present invention provides a method and system for handling program removal that negates the changes the removed program made to the shared file while maintaining subsequent product installation/configuration shared filed dependencies.

The various types of statements comprising a shared file are classified and described in a manner such that when a program is removed from or restored to a data processing system, each changed shared file entity (e.g. a statement) may be modified correctly. For example, for files like CONFIG.SYS found in OS/2 and MS-DOS, a matrix of statement characteristics (a file profile) may be defined that describes each statements syntax, whether limiting values apply to removed and/or restored statements types, removal rules for different statement types, etc. In a general sense, the syntax of a shared file entity describes how it looks. That is; its punctuation, whether its alphameric, numeric, computational, etc. Program removal and restoration may then be driven by the file profile rules that are associated with various shared filed statement types in accordance with a preferred embodiment of the present invention.

Basically, rules for shared filed statement types that are associated with each shared file are typically applied within the context of the following conditions in accordance with a preferred embodiment of the present invention:

if a statement within a "shared file" has an associated removal rule and the product that created/modified that statement is to be removed, then determine if subsequently installed/configured products have specified a pre/co-requisite dependency for this statement Keyword=Value(s).

a. If no pre/co-requisite dependency is noted after scanning subsequently installed/configured shared file profiles, then the removal rule specified for the file applies.

b. If one or more pre/co-requisite dependencies is noted after scanning subsequently installed/configured shared file profiles, then the Keyword=Values(s) statement is retained or modified to honor these other program dependencies.

Application Program Interfaces (APIs) are interfaces utilized to implement some of the processes of the present invention. A DEFINE API is employed to classify file statements in a situation in which files shared with other installed/configured programs are updated or referenced by a program's installation/configuration process. In this situation, changes made to shared files by a program's configuration/installation may not have dependencies with other programs installed or configured within the data processing system. In this case, derived file state changes may be adequate to obtain the changes made by the program's installation/configuration. Derived file state changes may be obtained by including "before-after" file content to determine what affect the particular installed/configured program had on the shared files.

The various types of statements that comprise a shared file must be classified and described in a manner such that when a particular program is removed or restored, the correct action may be taken. For files like CONFIG.SYS, a matrix of statement characteristics (a base file profile) can be defined through an API found within a manager 300, as illustrated in FIG. 3. In conjunction with this base file profile, a particular program's actual installation and configuration requirements may be derived by monitoring the before and after state of a shared file for a particular program. This procedure is contrasted to a specific API (i.e. DEPEND) that explicitly identifies a program's installation and configuration requirements for removal and restoration. Thereafter, program removal and restoration is driven by the file profile rules originating from a particular shared file's base file profile (only one per shared file) and shared file profiles (one per program modifying or referencing a particular shared file) associated with each installed/configured program.

The DEFINE API is employed for all shared files that are explicitly updated by a program's installation/configuration procedure using a file system's read/write capabilities. A "file system" is a collection of files and the file management structures on a physical or logical mass storage device, such as a diskette or minidisk. File statements have a file defined format including syntax and statement type. The term "statement type" pertains to the classification of statements possessing various syntax. For all products that update a particular shared file, the definition of each file statement syntax and type is accounted for in the specification of a single based API, the DEFINE API. Shared file syntax and statement types are associated with a file specified through the DEFINE API. In accordance with a preferred embodiment of the present invention, the format of this interface is DEFINE API followed by required positional and optional keyboard parameters. Either the system administrator of a distributed data processing system or the shipped program supplies the DEFINE APIs for statement types existing within a shared file to create the base file profile. This function aids in program removal and restoration.

The parameters of the DEFINE API, in accordance with a preferred embodiment of the present invention, are as follows:

Positional Parameter 1

This parameter specifies the drive, path and filename of a shared file's base profile. The DEFINE API creates this base profile. It is a product/administrator responsibility to specify a drive and path to insure base profile name uniqueness.

Positional Parameter 2

This parameter represents the Statement (e.g., Keyword) within the shared file.

Positional Parameter 3

This parameter specifies the type of shared file statement that could be, added, deleted or modified by an installed/configured product. The following list represents examples of supported types of statements:

SFV=Single Fixed Value

MFV=Multiple Fixed Value(s)

"Fixed" in that all of the value(s) (including Keyword) must be specified

MIV=Multiple Inserted Values(s)

"Inserted" in that the Keyword and only required value(s) must be specified

SCV=Single Computational Value

MCV=Multiple Computational Value(s)

"Fixed" in that all of the value(s) (including Keyword) must be specified

Computational Keyword parameters must be positional within a string of value parameters.

CMT=Comment

Note that the comment line contains the identifying begin line character(s). The supported character(s) include "REM", ",", and ";" and so on.)

Keyword Parameter/S

This parameter specifies the type of separator character for multiple parameters in a multiple Keyword=Value(s) statement. Examples include: ";" "," "+" "blank", and so on.

Keyword Parameter/L

For product removal this parameter specifies the lower limit for a statement type of "SCV/MCV=Single/Multiple Computational Keyword=Value(s)". Specification of this parameter acts as a limit check for the "Subtract" remove rule (see the/R keyword for an example of use). The meaning for this parameter indicates that, for product removal, the computational value cannot be less than this low limit value.

The parameter value(s) to be computed are numeric. For Multiple Computational Keyword=Values, the syntax of associating an individual limit with various positional computational values within the value string is to separate each value parameter with a separator character. Value parameters that are not computational (e.g., alphabetic) may be omitted by specifying a separator character for their omission. For example, a specification of/L: ,20,30, would be interpreted as limits of 20 and 30 existed for value parameters 2 and 3. Computational Keyword parameters must be positional within a string of value parameters.

Keyword Parameter/H

For product restoration, this parameter optional and specifies the upper limit for a statement type of "SCV/MCV= Single/Multiple Computational Keyword=Value(s)". Specification of this parameter acts as a limit check for the "Add" restore rule (see the/R keyword). The meaning for this parameter indicates that, for product restoration, the computational value cannot be greater than this Hi limit value.

The syntax of associating an upper limit with Multiple Computational Keyword=value(s) is the same as for the /L:keyword.

Keyword Parameter/R

This parameter associates a remove-restore rule with the Keyword defined in positional parameter 2. In most cases these rules can be inferred from the particular statement type definitions. For Multiple Computational Keyword=Value(s) or Multiple Keyword=Values(s), the syntax of associating rules with individual positional values within the value string is the same as for the/L: keyword. For example,/R: Add-Rem,subtract n,Add-Rem would be interpreted as apply the Add-Rem rule to parameter values 1 and 3 and apply the subtract n rule for parameter value 2. Only one rule can apply to each parameter value.

The removal rules for various statement types are:
"Add-Rem" applies to SFV, MFV, or MIV statement types.
The meaning of this rule is:
Add the statement or statement value(s) that a removed product deleted at its install/config time.
Delete the statement or statement value(s) that a removed product added at its install/config time.
"Subtract" applies to SCV or MCV statement types.

For product removal the meaning of this parameter is to subtract a computed value "n" from the appropriate Computational Keyword=Value(s).

The value "n" is the difference between the removed product shared file level value and the shared file level value preceding it. Thus if BUFFERS=30 is the statement existing in the shared file PRIOR to a particular program's installation/configuration and BUFFERS=50 is the statement in the shared file AFTER the product was installed/configured, the value of n would be 20 and it would be subtracted from BUFFERS=? to negate the removed program's affect. (This assumes that the dependencies of other programs were satisfied.) Note that succeeding program installs/configures that occurred after the product to be removed could have updated the BUFFERS=value to an unknown value.

The restoration rules for various statement types are:
"Add-Rem" applies to SFV, MFV, or MIV statement types.
The meaning of this rule is:
Add the statement or statement value(s) that is needed by a restored product but which is not present in the current state of the shared file.
Delete the statement or statement value(s) that is excluded by a product to be restored but which is present in the current state of the shared file.
"Add" applies to SCV or MCV statement types.

For product restoration the meaning of this parameter is to add a computed value "n" to the appropriate Computational Keyword=Value(s).

The value "n" is the difference between the removed product shared file level value and the shared file level value existing at its install/config time.

Placement of restored statements or statement value(s) are inserted relative to statement strings existing when the program was removed, or by the placement parameters specified in the DEPEND API.

For individual programs that update a shared file, particular statement dependencies may be specified through the definition of a DEPEND API. Use of this API is required if all of a program's install changes to a shared file cannot be derived from modifications that were made to the shared file during installation/configuration. Such a situation may exist if a statement was not added because it already existed, or a statement was not deleted because it did not exist, or a statement was not modified because it was already correctly modified.

A program's shared file modifications that are associated with a program may be explicitly specified as a statement of dependency through the DEPEND API. This API is employed to maintain the integrity of a shared file modified by a particular program. Either the shipped program or a system administrator typically causes the invocation of the DEPEND APIs to explicitly identify dependencies of a product on a particular shared file.

The DEPEND API has characteristics that include inclusive/exclusive parameter specification which indicates whether an identified element is to be included or excluded to satisfy a particular program's installation/configuration requirements. Also included in the API are positional specifications that indicate the relative location of one statement to another statement used in restoration. The API also may include Boolean expressions to further account for variations in existing file statements within the shared file. The following are a description of parameters for a DEPEND API in accordance with a preferred embodiment of the present invention:

Positional Parameter 1

This parameter specifies the name of the installed/configured program (also feature or fix). The DEPEND API can result in appending the subsequent line statement specification to a shared file profile (part of a program's Software Inventory Description) associated with the named program. The program name can contain qualifiers such as:
ProgramName. Instance. Token-1. Token-n. Level. FeatureId. FixId
Positional Parameter 3 provides the linkage to the base shared profile definitions shared by all programs for a given shared file.

Positional Parameter 2

This parameter string is required because it represents a statement dependency within the shared file. Statements may either by "explicitly" specified, contain a "placeholder" value which can be resolved after a product is actually installed/configured, or via the/B: parameter which can interrogate shared file statements/system variables to arrive at the correct statement value(s). For example:

- The explicit SFV statement, DEVICE= C:\OS2\DOS.SYS, would be a fully defined type statement in the absence of the/B: parameter.
- The "placeholder" MIV inserted statement SET PATH= &\IBMLAN need only contain the Keyword, drive placeholder and Value(s) that a product may add/extend to a particular shared file KEYWORD=VALUES(S) string.

Note that explicit pre-requisite values in an inserted string must be specified. The character "&" is used to indicate a placeholder for any value (or partial value)within a value string. For example, &:\&\&/WINOS2 could be resolved at product install/config time to C:\OS2\MDOS\WINOS2. It is this resolved string that will be a part of the product's shared file profile. Placeholder values can be determined by the/B: parameter file.

Computational Keyword=Value(s) statements may already be present in the particular shared file prior to a particular program's installation/configuration. Thus, a specification of FILES=20 might be interpreted as follows:

- IF a FILES statement does not exist, then the FILES=20 statement is the actual product requirement.
- IF a FILES statement does exist, then the FILES=20 statement might be modified to contain a value that is governed by the evaluation of the Boolean expression specified in the optional/B: parameter.

This Keyword=Value(s) parameter string can indicate either an inclusive or exclusive dependency (see the/D: parameter). Thus, if any other product that created/updated this Keyword=Value(s) statement, is to be removed, the specification of this statement together with the/ D:INCLUSIVE parameter would prevent its removal.

Positional Parameter 3

This parameter specifies the drive, path and file name of a shared file's base profile. The DEFINE API created this base profile.

Keyword Parameter/D

This parameter indicates the type of dependency (exclusive or inclusive) associated with positional parameter 2.

- An INCLUSIVE specification indicates that positional parameter 2 is a required install/config dependency. (positional parameter 2 was specifically included as an install/config requirement)

This could be the system default specification if the/D parameter is omitted.

- An EXCLUSIVE specification indicates that positional parameter 2 is a required install/config dependency. (positional parameter 2 was specifically excluded as an install/config requirement)

Note that if no other program indicated an inclusive dependency on the statement defined by positional parameter 2, and if the state of the shared file contained statement/ values referenced in positional parameter 2, then the affect of this inclusive specification would be to invalidate the statement/values.

For Multiple Computational Keyword=Value(s) or Multiple Keyword=Value(s), the syntax of associating dependencies with individual positional values within the value string is the same as for the/L: keyword (see the DEFINE API).

Keyword Parameter/S

This parameter indicates the character string that is used to position a Keyword=Value(s) statement string (positional parameter 2). Positioning relative to this string value is determined by the/P: parameter. Comment lines (e.g., lines beginning with the characters, REM) also participate in the string search.

Multiple non contiguous value(s) within the same Keyword can be accommodated by specifying a subsequent DEPEND API with the proper/S:,/P: parameters.

Note

Statement strings may be positioned relative to other statement strings (not yet present in the file) by making multiple passes through the file.

Keyword Parameter/P

If specified, then the statement string precedes or follows the character string specified in the/S: keyword. Since there can be multiple occurrences of a particular statement string, a valid specification consists of one of the following values:

FOLLOW FIRST

FOLLOW n (where n indicates the number of occurrences of the/S: string from the beginning of the file)

FOLLOW LAST

PRECEDE FIRST

PRECEDE n (where n indicates the number of occurrences of the/S: string from the beginning of the file)

PRECEDE LAST

The parameter FIRST refers to the first occurrence while LAST refers to the last occurrence.

Alternately, a valid specification may consist of one of the following values:

BEGIN (first statement in the file)

END (last statement in the file)

Keyword Parameter/B

This parameter is optional and specifies Boolean expressions that refine/qualify positional parameter 2 dependency statement values(s).

The/B: parameter consist of a sequenced list of Boolean expression lines delimited by parentheses. The/B: parameter and the right parenthesis character must be on the same line. The ending left parentheses is on a separate line. For example, the syntax would be:

```
/B: (
Boolean Expression i
. . .
Boolean Expression n
)
```

Each Boolean statement must be contained on a single line and its length can be limited (e.g., 255 characters). It begins with either SELECT, WHEN, OTHERWISE, END or * (for a comment line) and ends with a new line character.

The intent of this parameter is to account for variations in:

keyword=value(s) statements within a shared file system variables

These variations may affect the actual statement (positional parameter 2) modified by a program's installation/configuration program. The general format of supported Boolean expressions that allow multiple choices is:

```
SELECT
  WHEN expression 1 THEN instruction 1
  WHEN expression 2 THEN instruction 2
  WHEN expression 3 THEN instruction 3
  . . .

OTHERWISE
  Instruction n
END
```

If expression 1 is true, instruction 1 is processed. After this, processing ends If expression 1 is false instruction 2 is tested. If expression 2 is true, instruction 2 is processed. After this, processing ends If all WHEN expression statements are false, then processing continues with the instruction following OTHERWISE.

Expressions are evaluated left to right and ar composed of one or more elements (i.e., Keyword=Value(s) statements within the existing shared file and System Variables). Non existent elements cause that expression element evaluation to be false.

Instructions represent the refinement/qualification to positional parameter 2 based on the evaluation of the expression. Expression operators that relate elements are listed in their order of precedence and are itemized as follows:

- Comparison
  - =   equal
  - \=  not equal
  - <   greater than
  - >   less than
  - \<  not less than
  - \>  not greater than
- Logical
  - &   and
  - |   inclusive or
  - &&  exclusive or
  - \   not Parentheses can be used to force expression evaluation in a different order since expression elements inside parentheses are evaluated first.

Examples of Refinement/Qualification types include

Computational Values that may change depending on what currently exists in the shared file. For example, if a FILES=20 statement already exists in CONFIG.SYS, and the statement dependency specified in positional parameter 2 is FILES=30, then the net affect dictated by a Boolean expression may indicate that FILES=40 for positional parameter 2 is OK. Such an expression may be:

```
SELECT
WHEN FILES>15 THEN FILES=40
. . .
. . .
. . .
OTHERWISE
. . .
END
```

Substitution Values that may change depending on what currently exists in the shared file. For example, if the statement,
DEVICE=C:\IBMCOM\PROTOCOL\LANPDD.OS2, already exists in CONFIG.SYS, and the statement dependency specified was as follows:

```
SELECT
WHEN DEVICE =C:\IBMCOM\PROTOCOL\LANPDD.082 THEN
      DEVICE =C:\IBMLAN\NETPROG\RDRHELP.200
. . .
OTHERWISE
. . .
END
```

Then the placeholder value "&" in Positional Parameter 2 (&:\IBMLAN\NETPROG\RDRHELP.200) would be changed to C:\IBMLAN\NETPROG\RDRHELP.200. This would provide the target drive for an install/config that indicated a LAN file was to be installed on the same drive as Communications Manager.

Additionally, Placeholder characters appearing in a Boolean expression function as a Wildcard character. This causes a substitution of the first real value match from an existing shared file into the corresponding Wildcard element. This would have allowed additional flexibility in the previous example. For example,

```
SELECT
WHEN DEVICE =&:\IBMCOM\PROTOCOL\LANPDD.OS2 THEN
      DEVICE =&:\IBMLAN\NETPROG\RDRHELP.200
. . .
. . .
OTHERWISE
. . .
END
```

This then eliminates the need to specify multiple expressions for all possible drive letters for Communications Manager.

Optional Included Statement (Positional Parameter 2) that may be included depending on what currently exists in the shared file. for example, if the statement, IFS= C:\OS2\HPFS.IFS existed in CONFIG.SYS, and the statement dependency specified was as follows:

```
SELECT
WHEN IFS=C:\OS2\HPFS.IFS . . . THEN RUN=. . .
. . .
. . .
OTHERWISE
. . .
END
Then the RUN =. . . statement in Positional Parameter 2 would be
included if the High Performance File system was already
installed/configured.
```

The combination of the DEFINE API and the DEPEND API together with changes derived from an actual program installation make up a particular program's remove/restore profile for a particular shared file. For each installed program, a separate dependency profile exists for each shared file. For a particular program the profile for a shared filed is formed by both the base DEFINE file profile and the shared DEPEND file profile.

Figure 5:
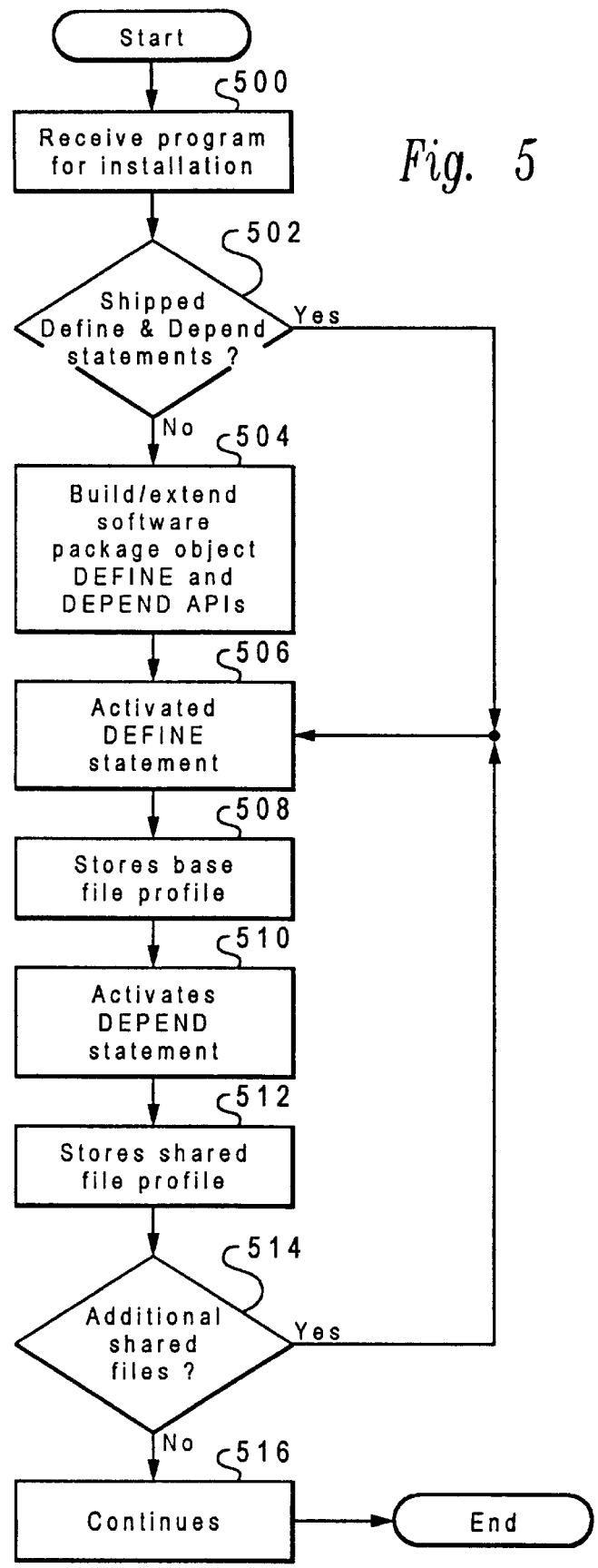

With reference to FIG. 5, a flowchart of a process for defining shared files associated with a particular program in accordance with a preferred embodiment of the present invention. With each shared file is a profile definition and a list of requirements for this program. The program can be removed or restored. The process begins by receiving a program for installation (step 500). A determination of whether DEFINE and DEPEND statements were shipped with the program is made (step 502). If DEFINE and DEPEND statements were not shipped with the program, these statements are created (step 504) by the user, typically a system administrator for a distributed data processing system. DEFINE statements and DEPEND statements are needed for each shared file required by the program to be installed/configured. The process is then prepared to activate the DEFINE and DEPEND APIs (1 DEFINE API per DEFINE statement and 1 DEPEND API per DEPEND statement) for the client workstation. The client workstation is the computer in which the program is to be installed.

Next, DEFINE statements are activated in the client workstation to specify the shared filed syntax, rules, etc. (step 506). DEFINE statements for each shared file required by a program are specified. Thereafter, the process stores the base file profile created by the DEFINE statements in a data storage device (step 508). Typically, the base file profile is served somewhere within a server computer shared by other client workstations. The process then activates the DEPEND statements to specify a program's requirements for each shared file statement within a shared file (step 510). Activation of the DEPEND statements results in a shared file profile that is stored in a data storage device (step 512). Typically, this shared file profile is stored on the client workstation.

The process then determines whether additional shared files are required by the program (step 514). If additional shared files are required by the program the process then return to step 506. Otherwise, the process continues with program installation and configuration (step 516).

Figure 6A:
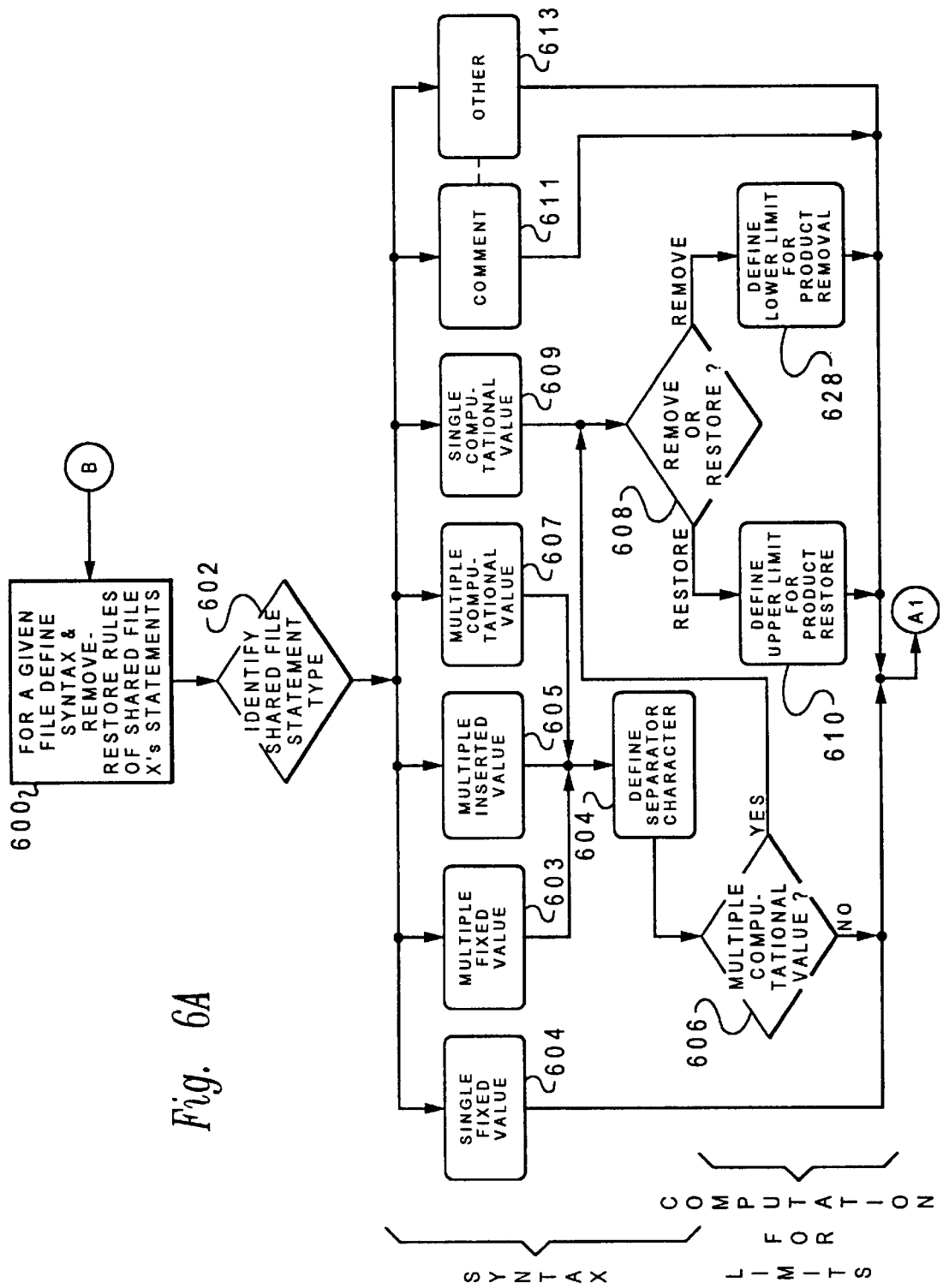
FIGS. 6A–6B are a flowchart of a process using a DEFINE API depicted in accordance with a preferred embodiment of the present invention.
Figure 6B:
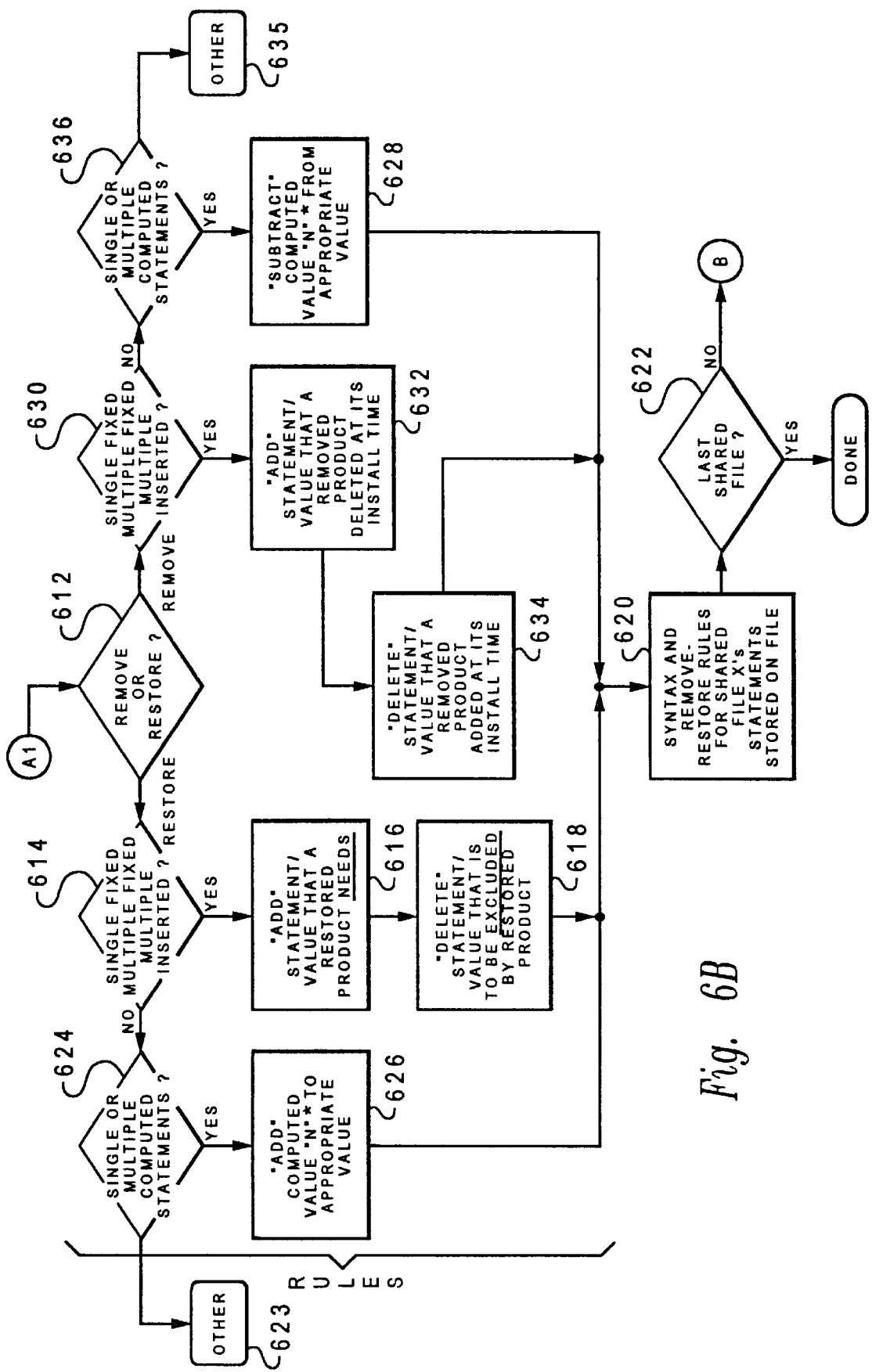

With reference now to FIGS. 6A–6B, a flowchart of a process using a DEFINE API is depicted in accordance with a preferred embodiment of the present invention. The process begins by defining the syntax and remove/restore rules for shared filed X's statements (step 600). Thereafter, the process identifies the shared file statement type (step 602). The shared file statement type may be identified as single fixed value 601, multiple fixed value 603, multiple inserted value 605, multiple computational value 607, single computational value 609, comment block 611, or "other" block 613. If the shared file statement is identified as multiple fixed value 603, multiple inserted value 605, or multiple computational value 607, the process then defines a character separator used in multivalued statements (step 604). The process then determines whether computational values are in the shared file statement (step 606). If multiple computational values are present, the process then associates upper and lower limits with computational statement types as part of the base profile definition specified by DEFINE statements (step 608). This is used in product removal/restoration (step 626).

If the program is to be removed, the process then defines a lower limit for the program removal (step 628). If the program is to be restored, the process then defines an upper limit for the program restore (step 610). An "upper limit" is the maximum value which a computational value may possess on a restore function. The process then again determines whether the program is to be removed or restored (step 612). This decision step is directly reached from step 602 if the shared file statement type is identified as a single fixed value 601, a comment 611, other 613. The other in block 613 indicates that a preferred embodiment of the present invention may process other shared filed statement types other than those depicted in blocks 601, 603, 605, 607, 609, and 611.

If the program is to be restored, the process then determines whether the statements include single fixed, multiple fixed, or multiple inserted statements (step 614). If any of these types of statements are included, the process then defines a rule that adds a statement or value that a restored program needs (step 616). The process also defines a rule that deletes statements and/or values that are to be excluded by the restored program (step 618). Thereafter, the syntax and remove/restore rules for a shared file X's statements are stored on a file. For each file that is to be shared in the system, a base DEFINE profile definition needs to be specified. This file contains the syntax and rules for all program removals and restorations (step 620). Thereafter, the process determines whether this is the last shared file to be processed (step 622). If this is not the last shared file to be processed, the process returns to step 600. Otherwise, the process terminates.

Referring again to step 614, if the statements do not include single fixed, multiple fixed, and multiple inserted statements, the process then proceeds to determine whether single or multiple computed statements are present (step 624). If the answer to this determination is yes, the process then defines a rule that adds the computed value "n" to the appropriate value (step 626). The value "n" is the difference between the installed program's shared file statement value and the shared filed statement value proceeding the installation of the program. The process then proceeds to step 620 as described above. On the other hand, if single or multiple computation statements are not present, the process then proceeds to "other" processing (step 623). This step indicates that other statements not specifically depicted in the flowchart illustrated by FIG. 6A and 6B, but also may be processed in accordance with a preferred embodiment of the present invention.

Referring again to block 606, if the program is to be removed, the process then defines a lower limit for the program removal (step 626). A "lower limit" is the minimum value which a computational value may posses on a remove function. The process then again determines whether the program is to be removed or restored as described before in step 612. With a removal, the process then proceeds to determine whether single fixed, multiple fixed, or multiple inserted statements are present in the file (step 630). If single fixed, multiple fixed, or multiple inserted statements are present, the process defines a rule that then adds the statement and/or value that a removed program deleted at the time of the program's installation (step 632). The process also defines a rule that deletes the statement and/or value that a removed program added at the time of the program's installation (step 634). The process then proceeds to store on a file the syntax and remove/restore rules for the shared file X's statements. Again, the process determines whether this was the last shared file to be processed step 622 if so, the process terminates. Otherwise the process returns to step 600 as described above.

Referring again to step 630, if single fixed, multiple fixed, or multiple inserted statements are not present in the shared file, the process then determines whether single or multiple computed statements are present within the shared file (step 636). If these types of computed statements are present, the process then defines a rule that subtracts the computed value "n" to the appropriate value (step 638). Again, "n" is the difference between the installed program's shared statement value and the shared file statement value preceding the installation of the program. The process then proceeds to step 620 as previously described. Referring again to step 636, if single or multiple computed statements are not present, the process then proceeds to "other" processing (step 635). This step indicates that other statements not specifically depicted in the flowchart illustrated by FIG. 6A and 6B also may be processed in accordance with a preferred embodiment of the present invention.

Figure 7:
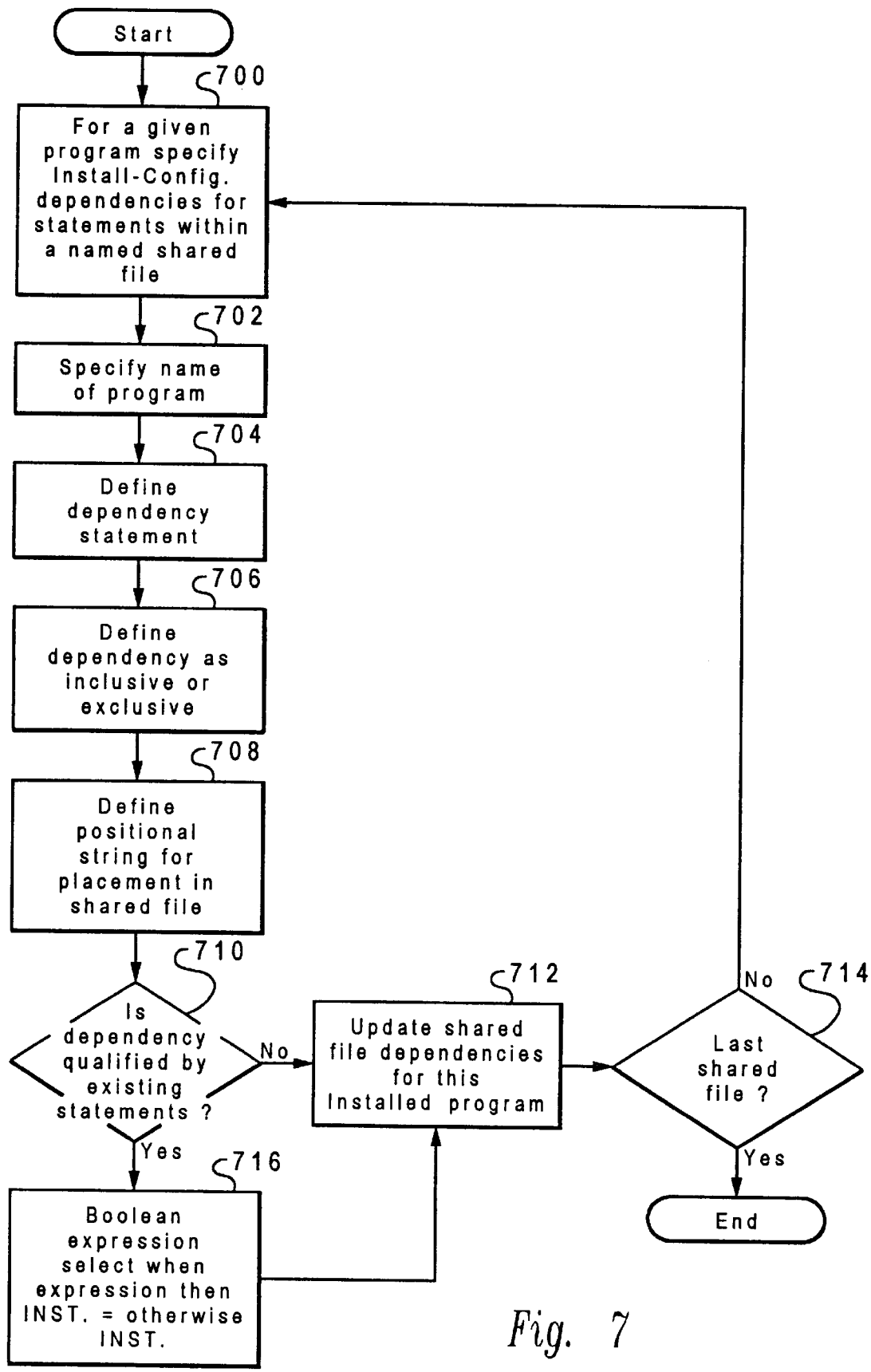
FIG. 7 is a flowchart of a process for defining shared files associated with a particular program such that the program can be removed or restored in accordance with a preferred embodiment of the present invention.

With reference now to FIG. 7, a flowchart of a process followed by a DEPEND API is depicted in accordance with a preferred embodiment of the present invention. The process begins by specifying installation/configuration dependencies for statements within a named shared file for a given program (step 700). Thereafter, the process specifies the name of the program (step 702). The process also specifies dependency statements (step 704). Next, dependency statements are defined as being either inclusive or exclusive (step 706). The process then defines the positional string for placement in the shared file (step 708).

Next, a determination is made as to whether the dependency is qualified by the existing shared file's Keyword= Value(s) statements (step 710). If the dependency is not qualified by an existing shared file's Keyword =Value(s) statements, the process then updates the shared file dependencies for the installed program in the shared file profile (step 712). Thereafter, the process determines whether the last shared file has been processed (step 714). If the last shared file has been processed, the process terminates. Otherwise, the process returns to step 700 as previously described.

Figure 8:
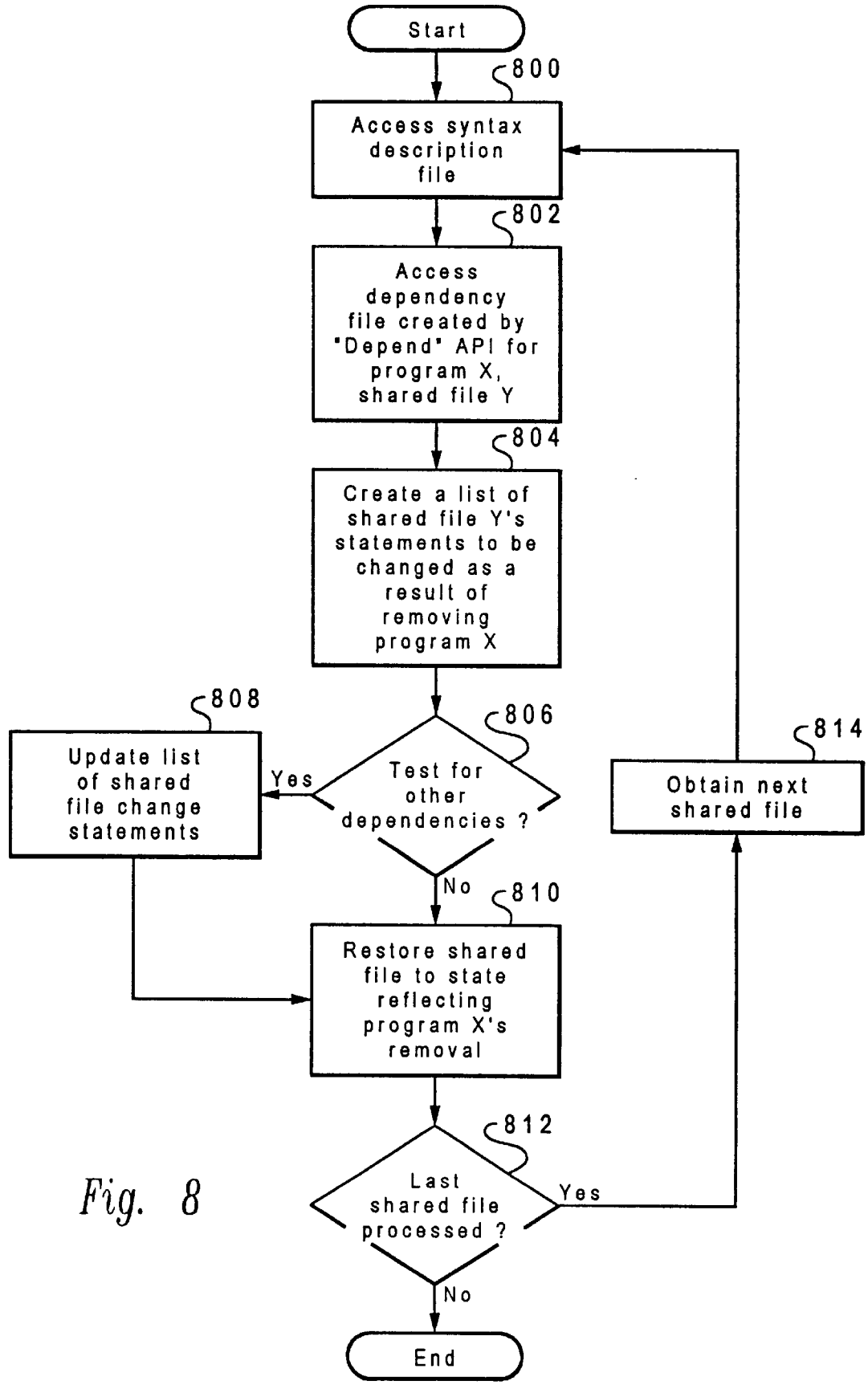
FIG. 8 is a flowchart of a process for removing a program depicted in accordance with a preferred embodiment of the present invention.

With reference again to step 710, if the dependency is qualified by existing shared file's Keyword=Value(s) statements, the process then performs Boolean expression evaluation (step 716). Boolean expressions refine/qualify a statement dependency based on existing variables and other statements within the shared file. Thereafter, a determination of qualification types is made with the process advancing to step 712 as previously discussed. As mentioned before, a number of qualifications may exist, such as computational, substitutional, optional, or other. A computational qualification indicates that the computational value may change depending on depending on what currently exists in the shared file. Substitutional qualifications indicate that the substitutional value may change depending on what currently exist in the shared file including "placeholder" dependency statements. An optional qualification indicates that an optional statement may be included depending on what currently exists in the shared file.

with reference now to FIG. 8, a flowchart of a process for removing a program is depicted in accordance with a preferred embodiment of the present invention. The process begins by accessing the syntax and rule description in the base file profile created by the DEFINE API for a program for a particular shared file (step 800). For the program to be removed, the process then accesses the shared file profile in the file created by the DEPEND API for the program and the shared file (step 802). Next, a list of the shared file's statements to be changed in response to removing the program is created (step 804).

Next, a determination of whether any other program has a dependency for the shared file statements to be changed (step 806). If another program has a dependency for any of the shared file statements to be changed, the process then updates the list for the shared file change statements to honor other program's dependencies for the same shared file (step 808). "Honor" means the affect on any statement to be updated in a program's removal will take into account any dependency on that statement indicated by other programs. Thereafter, the shared file is restored to the state that reflects the removal of the program (step 810).

With reference again to step 806, if no other program has a dependency for the shared file statements that are to be changed, the process proceeds directly to step 810. Thereafter, a determination is made as to whether the shared file is the last shared file to be processed to reflect the removal of the program (step 812). If additional shared files are to be processed, the next shared file is obtained for processing (step 814). Thereafter, the process returns to step 800 as described above. If the last shared file has been processed, the process then terminates.

One advantage of the present invention is that it saves time and space verses a traditional method of supporting a system wide level removal/restoration capability. Furthermore, no program awareness of the remove/restore activity performed by the present invention is required. Archival product restoration may be supported for days, weeks, months after a program has been removed from a data processing system. Furthermore, the present invention provides dynamic definition of a shared file profile that permits profile definitions for program removal/restoration to occur after the program was originally installed in the data processing system. Additionally, the present invention provides DEFINE and DEPEND APIs, which do not have to be specified during the installation of a program. These APIs need only be invoked prior to the program's removal.

The depicted embodiment was described with reference to a distributed data processing system. It will be apparent to those of ordinary skill in the art that the depicted embodiment may be modified for use in a single computer data processing system or for use other data processing systems not shown in the depicted embodiment.

The processes depicted in FIGS. 3–8 may be implemented by those of ordinary skill in the art within the data processing system depicted in FIGS. 2A and 2B. The processes of the present invention also may be implemented in a program storage device that is readable by a data processing system, wherein the program storage device encodes data processing system executable instructions coded for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system maintaining programs, wherein a plurality of programs within the data processing system share a data structure, wherein the data structure includes a plurality of statements, the method comprising:

providing a base profile, wherein the base profile includes rules for altering the plurality of statements located in the data structure;

creating a shared profile for the data structure that is shared by the plurality of programs, wherein the shared profile includes requirements/dependencies for the data structure shared by the plurality of programs;

removing a first of the plurality of programs from the data processing system; and altering the shared data structure using the base profile and the shared profile such that the remaining ones of the plurality of programs remain on the data processing system unaffected by the alteration of the shared data structure, wherein programs within the data processing system are efficiently maintained.

2. The method of claim 1, further comprising:

restoring the first of the plurality of programs to the data processing system; and altering the data structure using the profile such that the first of the plurality of programs may execute within the data processing system while the remaining ones of the plurality of programs may execute unaffected by the alteration of the data structure.

3. The method of claim 1, wherein the step of creating a shared profile includes monitoring installation/configuration requirements for a program to obtain a program's dependencies in response to an installation/configuration of the program.

4. The method of claim 1, wherein a statement within the plurality of statements includes a value, wherein the statement affects the first of the plurality of programs and at least one other of the plurality of programs, wherein the altering step includes altering the value in the statement.

5. The method of claim 4, wherein the value is altered to a minimum value required by the at least one other program within the plurality of programs.

6. A data processing system for maintaining programs, wherein a plurality of programs within the data processing system share a data structure, wherein the data structure includes a plurality of statements, the data processing system comprising:

first creation means for creating a base profile, wherein the base profile contains information for altering the plurality of statements within the data structure;

second creation means for creating a shared profile for the data structure that is shared by the plurality of programs, wherein the shared profile includes requirements/dependencies for the plurality of programs;

removal means for removing a first of the plurality of programs from the data processing system; and alteration means for altering the shared data structure using the base profile and the shared profile such that the remaining ones of the plurality of programs remain on the data processing system unaffected by the alteration of the shared data structure, wherein programs within the data processing system are efficiently maintained.

7. The data processing system of claim 6, further comprising:

restoration means for restoring the first of the plurality of programs to the data processing system; and second alteration means for altering the data structure using the profile such that the first of the plurality of programs may execute within the data processing system while the remaining ones of the plurality of programs may execute unaffected by the alteration of the data structure.

8. The data processing system of claim 7, wherein the first of the plurality of programs may be restored for a preselected period of time.

9. The data processing system of claim 6, wherein the plurality of programs is two.

10. The data processing system of claim 6, wherein the plurality of programs is five.

11. The data processing system of claim 6, wherein a second plurality of programs are present within the data processing system and at least one additional data structure.

12. The data processing system of claim 11, wherein the creation means creates a profile for each data structure shared by at least two programs.

13. A storage device readable by a data processing system and encoding data processing system executable instructions for the data storage device comprising:

first creation means for creating a base profile, wherein the base profile contains information for altering statements within the data structure;

second creation means for creating a shared profile for the data structure that is shared by the plurality of programs, wherein the shared profile includes requirements/dependencies for the plurality of programs;

removal means for removing a first of the plurality of programs from the data processing system; and alteration means for altering the shared data structure using the base profile and the shared profile such that the remaining ones of the plurality of programs remain on the data processing system unaffected by the alteration of the shared data structure, wherein the means are activated when the storage device is connected to and accessed by a data processing system.

14. The storage device of claim 13, wherein the storage device is a hard disk drive.

15. The storage device of claim 13, wherein the storage device is a ROM for use with a data processing system.

16. The storage device of claim 13, wherein the storage device is a floppy diskette.

17. A data processing system for maintaining programs, wherein the plurality of programs within the data processing system share a data structure, wherein the data structure includes a plurality of statements, the data processing system comprising:

profile information, wherein the profile information includes rules for altering statements within the data structure and dependencies for the plurality of programs sharing the data structure;

alteration means, responsive to a change in a number of the plurality of programs, for altering the shared data structure using the profile information such that the plurality of programs remain on the data processing system unaffected by the alteration of the shared data structure, wherein the plurality of programs within the data processing systems are efficiently maintained.

18. The data processing system of claim 17 further comprising removal means for removing a program from the plurality of programs from the data processing system.

19. The data processing system of claim 18, wherein the data structure includes a plurality of statements, wherein one of the plurality of statements includes a value affecting two programs within the plurality of programs, wherein the alteration means includes means for altering the value in the statement in response to a removal of one of the two programs within the plurality of programs.

20. The data processing system of claim 19, wherein the value is altered to a minimum value required by the other of the two programs within the plurality of programs.

21. The data processing system of claim 17 further comprising addition means for adding a program to the plurality of programs in the data processing system.

22. The data processing system of claim 17, wherein the profile information for altering statements is stored in a base profile and the dependencies are stored in a shared profile.

23. The data processing system of claim 17, wherein the data structure is a config.sys file.

\* \* \* \* \*

UNITED STATES PATENT AND TRADEMARK OFFICE
CERTIFICATE OF CORRECTION

PATENT NO. : 5,872,979
DATED : Feb. 16, 1999
INVENTOR(S) : *Edel et al.*

It is certified that error appears in the above-identified patent and that said Letters Patent is hereby corrected as shown below:

In col. 2, line 55, please change "FIG. 7" to -- FIG. 5 --.

In col. 6, line 43, please change "vase" to -- base --.

In col. 13, line 32, please change " <   greater than" to

-- >   greater than --;

in line 33, please change ">   less than" to -- <   less than --.

In col. 14, line 2, please change "\LANPDD.082 THEN" to -- \LANPDD.0S2 THEN --.

Signed and Sealed this

Twelfth Day of October, 1999

Attest:

Attesting Officer

Q. TODD DICKINSON

*Acting Commissioner of Patents and Trademarks*